Oct. 8, 1957   W. BAER ET AL   2,809,313
FISSION COUNTER

Filed Sept. 18, 1953   2 Sheets-Sheet 1

Fig. 5.
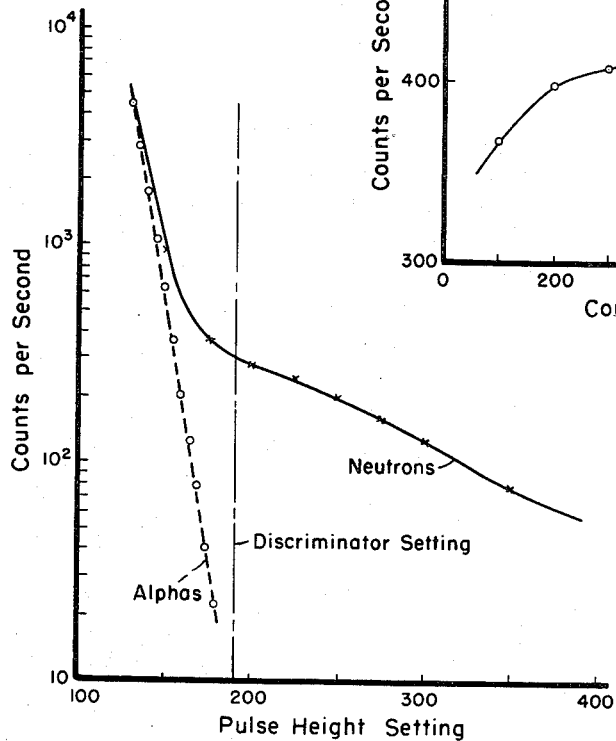
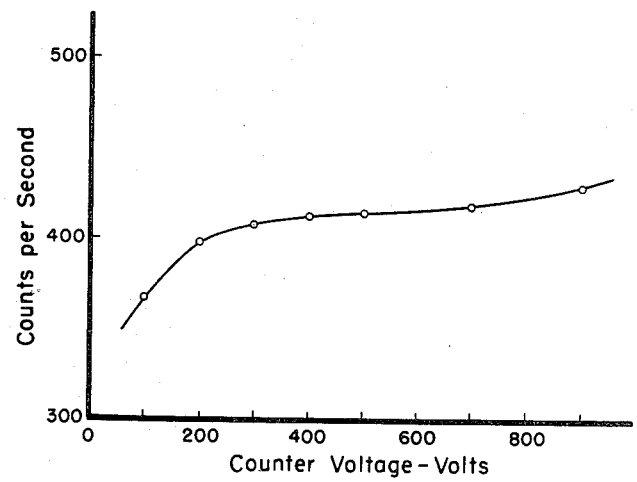
Fig. 6.
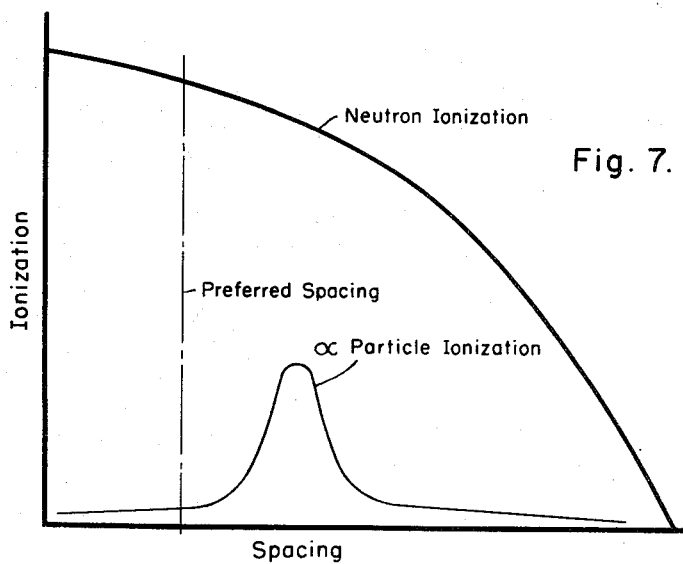
Fig. 7.

United States Patent Office 2,809,313
Patented Oct. 8, 1957

2,809,313

FISSION COUNTER

William Baer, Pittsburgh, Robert T. Bayard, Turtle Creek, and Oliver F. Swift, Pittsburgh, Pa., assignors to Westinghouse Electric Corporation, East Pittsburgh, Pa., a corporation of Pennsylvania Application September 18, 1953, Serial No. 380,964

13 Claims. (Cl. 313—61)

Our invention relates to electric discharge apparatus and has particular relation to fission counters.

A fission counter is a pulse ionization chamber which is capable of detecting so-called thermal or slow neutrons by means of ionization pulses in the gas of the chamber produced by fission fragments resulting from fission caused by the neutrons. Thermal or slow neutrons are those capable of producing fission in the fissionable isotopes of uranium or thorium, the most common being the one having atomic weight 235, which will be called herein as $U^{235}$. A fission counter usually includes a material coated with a compound which is rich in fissionable material such as $U^{235}$. Neutrons impinging on this material produce fission, the fragments of which produce the ionization to be measured.

The uranium or similar fissionable materials used in a fission counter is itself radioactive, emitting alpha particles in measurable quantities. These alpha particles tend to confuse the response of the counter.

Fission counters are sometimes used to measure thermal neutron densities and it is desirable that for such service they be highly sensitive. When used for this purpose, the fission counter is disposed in the immediate vicinity of the source of neutrons. Our invention in its specific aspects concerns itself with a fission counter so disposed. Gamma rays are usually produced in large quantities within or near a source of neutrons. This radiation produces ionization within the counter and tends to confuse the indication of the counter. The gamma radiation presents a peculiar difficulty in this connection because at times it tends to produce ionization pulses simultaneously which build up to a high amplitude not ordinarily distinguishable from the signal produced by fission.

A fission counter disposed to indicate effectively the thermal neutron density often must be capable of operating satisfactorily over a wide temperature range produced in or near the source of neutrons. We have found this range to be at least from 20° C. to 80° C. The fission counter must also be capable of withstanding the high temperature.

It has been the practice in accordance with the teachings of the prior art to pump the gaseous mixture continuously through the counter or to clean the counter out periodically so that the fission products, some of which are gaseous, would be continuously removed. Such continuous pumping or periodic cleaning out complicates the use of the counter materially.

It is accordingly an object of our invention to provide a fission counter having a high sensitivity to thermal neutrons.

Another object of our invention is to provide a sensitive fission counter having a minimum response to the confusing radiation produced by or in the vicinity of the counter such as the alpha radiation of the fissionable material and the gamma radiation of a source of neutrons.

Still another object of our invention is to provide a fission counter capable of operating reliably and continuously over a temperature range at least from 20° to 80° C.

A further object of our invention is to provide a fission counter capable of operating reliably when subject to, and of withstanding, severe shock and vibration.

An incidental object of our invention is to provide an electric discharge device of novel structure.

Another incidental object of our invention is to provide a sealed off fission counter.

In accordance with our invention, we provide a fission counter in which the electrodes are of large area and in spite of this fact are so constructed and so mounted as to be capable of withstanding severe shock and vibration. Specifically we provide a discharge device made up of cylindrical assemblies each assembly consisting of a plurality of end blocks of progressively increasing cross-sectional area, each end block carrying a cylinder. The cylinders are of progressively increasing cross-sectional area corresponding to the blocks by which they are carried. The blocks of smaller diameter of each assembly are secured within the blocks of larger diameter of each assembly. The cylinder of smallest cross-sectional area which extends from the end block of one assembly may be solid or hollow; the other cylinders of this assembly are hollow. The cylinders of the other assembly are all hollow and each is of greater cross-sectional area than a corresponding cylinder of the first assembly. The assemblies are mounted face-to-face with the cylinders interlacing. The cylinders are thus supported from the assemblies as cantilever beams and are capable of withstanding shock and vibration as such beams. To improve the resistance to shock and vibration, the cylinder of smallest cross-sectional area is tapered.

In using the word "cylinder" herein, we use it in its broad geometric sense, in which it signifies not only a circular cylinder, but any surface formed by a line moving parallel to itself over a plane curve. In accordance with the specific aspects of our invention, the cylinders herein are of circular cross-section.

In accordance with our invention the cylindrical electrodes are coated with uranyl oxide, which will herein be referred to as $U_3O_8$, in which the uranium is substantially enriched in the $U^{235}$ isotope. Preferably the enrichment should be to more than 90%, that is the uranium of the compound instead of having only .7% $U^{235}$, has 90% $U^{235}$. The cylinder of smallest cross-sectional area is coated only on its outer surface and the cylinder of largest cross-sectional area on its inner surface. The other cylinders are coated on both surfaces.

The fission counter in accordance with our invention is sealed off and contains a gaseous medium at a pressure of the order of one atmosphere. While this medium could include a number of different gaseous mixtures, it preferably includes a mixture of 99% pure argon and 1% pure nitrogen. It is to be noted that our practice in providing a fission counter which is permanently sealed off is a departure from the prior art teaching, but we have found that our sealed off counter operates satisfactorily.

The novel features that we consider characteristic of our invention are set forth generally above. The invention itself both as to its organization and its method of operation, together with additional objects and advantages thereof, will be understood from the following description of a specific embodiment when read in connection with the accompanying drawings, in which:

Figs. 5, 6 and 7 are graphs illustrating the operation of our invention.

Figure 1:
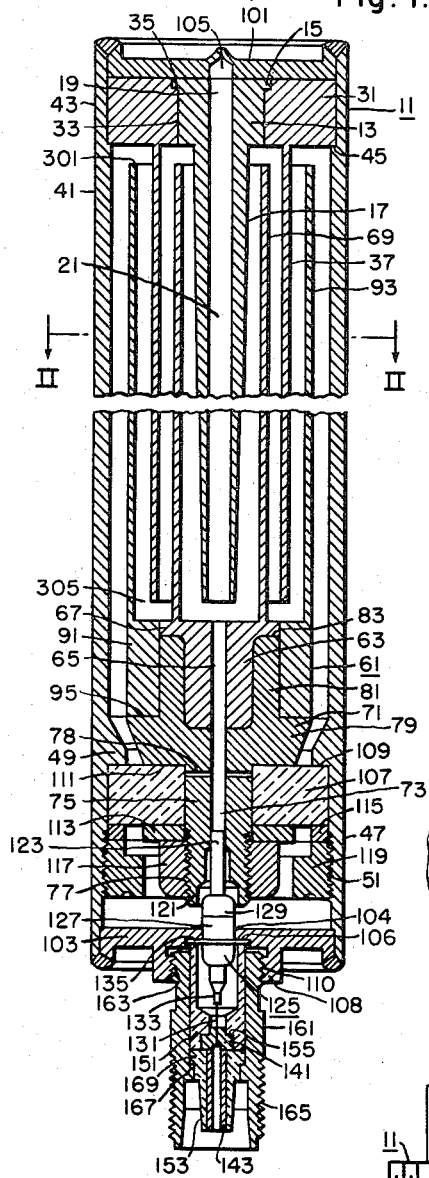
Figure 1 is a view in longitudinal section of a preferred embodiment of our invention.
Figure 2:
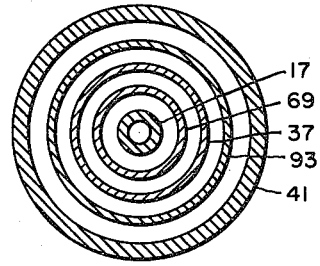
Fig. 2 is a view in transverse section taken along line II—II of Fig. 1 of a preferred embodiment of our invention.
Figure 3:
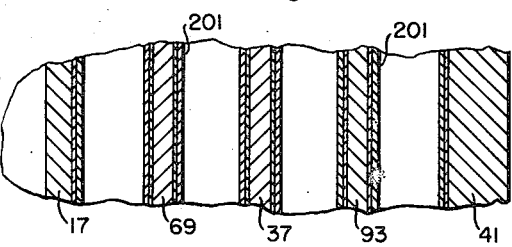
Fig. 3 is a view in transverse section enlarged of the embodiment shown in Figs. 1 and 2.

The apparatus shown in Figs. 1 through 3 include a first cylindrical assembly 11. This assembly 11 includes an inner circularly cylindrical block 13 having a flange 15 at one end. A hollow elongated circular cylinder 17 in the form of a rod extends centrally from the other end. The cylinder 17 is tapered being of smallest diameter at its extending end. The block 13 has an opening 19 which is coextensive with the opening 21 in the rod. The assembly 11 also includes an intermediate circularly cylindrical end block 31 having an opening 33 therein of somewhat smaller diameter than the outer diameter of block 13 and having a shoulder 35 adapted to engage the flange 15. A hollow elongated circular cylinder 37 extends from the block 31. The assembly 11 further includes an outer elongated circular cylinder 41 near one end 43 of which there is a shoulder 45. This end has an inner diameter somewhat smaller than the outer diameter of the end block 31 and is of greater length than the end block 31. Near the other end 47 the cylinder 41 carries an internal ring-shaped projection 49 tapered towards the first end 43 and flat towards the end 47. Near the end 47 there is also a thread 51 in the cylinder 41. The end 43 of the cylinder 41 performs a function similar to end cylindrical blocks 13 and 31 and may be referred to herein as an end block.

The assembly 11 is formed by shrinking each block of smaller outer diameter into one of progressively larger outer diameter.

To accomplish this object the block 13 is cooled in liquid nitrogen and inserted into the block 31 with the flange 15 engaging the shoulder 35. When the cooled block 13 regains normal temperature, it expands, becoming tightly secured in the block 31 of larger diameter. The unit including blocks 13 and 31 is similarly shrunk into the end 43 of cylinder 41 with the cylinder 31 engaging the shoulder 45.

The apparatus shown in Figs. 1 to 3 also includes a second end cylindrical assembly 61. The inner unit of this assembly includes a circularly cylindrical block 63 having a central tubular opening 65 and a flange 67 from which an elongated circular cylinder 69 extends. The diameter of cylinder 69 is greater than the diameter of cylinder 17 and smaller than diameter of cylinder 37. The block 63 is secured within a composite block 71 with a central tubular opening 73. The block 71 has a stem 75 threaded at its end 77. The stem includes a cross opening 78 to facilitate exhausting of the apparatus. A central portion 79 of trapezoidal section extends from the stem 75 and a pot-shaped extension 81 projects centrally from the portion 79. The extension 81 has an internal diameter somewhat smaller than the diameter of the block 63. Its length is such that when the block 63 is secured within the extension 81, the upper surface 83 of extension 81 serves as a shoulder on which the flange 67 rests. The assembly 61 also includes a hollow circularly cylindrical block 91 from which an elongated hollow circular cylinder 93 extends. The outer surface of cylinder 93 is coextensive with the outer surface of block 91. The diameters of cylinder 93 are smaller than the inner diameter of cylinder 41 and larger than the outer diameter of cylinder 37. The inner diameter of block 91 is just smaller than the outer diameter of extension 81 and the length of block 91 is such that when it is secured on extension 81 and the flange 67 of block 63 it rests on the surface 95 of portion 79 as a shoulder. The assembly 61 is formed by shrinking block 63 into block 71 and then shrinking blocks 63 and 71 into block 91.

The assemblies 11 and 61 are mounted end-to-end with the elongated cylinders 17, 69, 37, 93 and 41 interlacing, the cylinder 69 lying between cylinders 17 and 37 and cylinder 93 lying between cylinders 37 and 41. When so mounted the assemblies 11 and 61 are unrelated from each other and cylinder 41 in effect constitutes a tube housing the cylindrical assemblies as a unit. This tube may be formed into a closed housing by end plates 101 and 103 welded to the ends 43 and 47 respectively of the tube 41. The end plate 101 is provided with a central opening 105 through which the container may be exhausted. The end plate 103 has a central opening 104 with a shoulder 106. A projection 108 having an internal thread 110 extends from the plate 103 adjacent the shoulder 106.

At the end adjacent the assembly 61 the container 41–101–103 is provided with facilities for supporting the assembly 61 and connecting the hot terminal of a power supply to it. These facilities included a hollow cylindrical insulator 107 mounted about the stem 75 just above the thread 77 and engaging the inner wall of cylinder 41 with the lower surfaces 109 and 111 of the ring 49 and the section 79 serving as supporting shoulders. The insulator is held by an inner washer 113 slipped over the stem 75 and a ring washer 115 which is slipped into the cylinder 41. The inner washer 113 is held against the insulator 107 by a nut 117 screwed onto thread 77 and the ring washer 115 by a nut 119 screwed into the internal thread 51 in the outer cylinder 41. The insulator 107 provides insulation between the lower portion of the assembly 61 and the outer cylinder 41 of the assembly 11.

The end 121 of the opening 73 in the stem 75 is of greater diameter than the remainder of the opening 73. One end of a metallic tube 123 of a metal-glass seal assembly 125 extends through the end 121 of the opening 73 making firm electrical contact with the wall of the opening 73 and thus with the assembly 61. This assembly 125 includes a metal eyelet 127 within which a glass tube 129 is sealed. The metal tube 123 extends through the glass tube 129 and is sealed to it. The tube 123 carries a wire 131 at the other end 133 where it is finished off and welded to the wire. The flange 135 of the eyelet 127 is soldered to the shoulder 106 of the end cap 103 producing a vacuum seal in this region of the container 41–101–103.

The wire 131 extends through a unit consisting of a small cylindrical block 141 to which a pin jack 143 adapted to engage the pin of a connector (not shown) such as Amphenol type HN made by American Phenolic Co. is centrally secured by soldering for example. The wire 131 is soldered to the block 141. The block 141 and pin jack 143 are held in cylindrical insulators 151 and 153 respectively. Insulator 151 is provided with an internal shoulder 155 which is engaged by a cooperative shoulder of block 141. Insulators 151 and 153 are disposed within a shell 161 having threaded ends 163 and 165. The thread 163 engages the thread 110 in the projection 108. The thread 165 is adapted to engage the internal thread of the above-mentioned connector. The shell 161 has a flange 167 near its end. This flange engages a shoulder 169 of the insulator 153 so that when the shell 161 is screwed onto the projection 108, the insulator 153 and the pin jack 143 are held firmly. The ends of the insulator 153 and pin jack 143 project into the lower part of shell 161 and the insulator 153 is tapered to accommodate the corresponding part of a connector.

Figure 4:
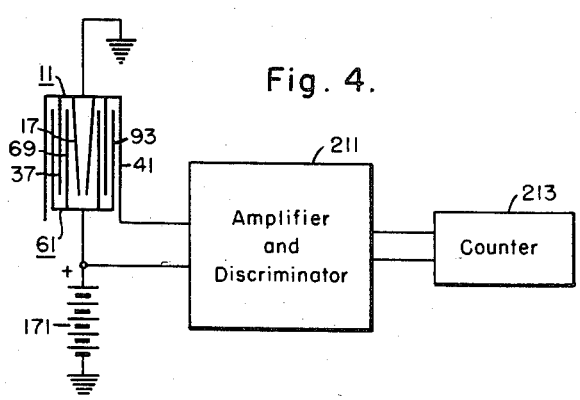
Fig. 4 is a diagrammatic view showing a circuit in accordance with our invention.

As shown in Fig. 4 the cylindrical assembly 61 may be connected through a connector to the positive terminal of a power supply 171 preferably of the direct current type. The assembly 11, on the negative terminal, may be grounded.

Because of its complexity, the manner in which the discharge device shown in Figs. 1 through 3 is assembled will now be disclosed. As a first step, the inner block 13 of the first assembly 11 is secured to the intermediate block 31 and the intermediate block 31 is secured to the outer cylinder 41. Next, the intermediate block 71 of the lower assembly 61 is secured to the inner block 63 and the outer block 91 is secured to the intermediate block 71 and the inner block 63. The insulator 107 is then disposed against the surface 111. The inner washer 113 is then slipped over the stem 75 of the intermediate block 71 and is secured by the nut 117 screwed onto the stem 75. The assemblies 11 and 61 are then mounted with their elongated cylinders interlaced. The outer ring washer 115 is then placed on the insulator 107 and secured by the nut 119 screwed into the outer cylinder 41. The insulator 107 now engages surface 109. The nuts 117 and 119 holding the assembly 61 are staked and the end caps 101 and 103 are welded in place. In welding the end caps, argon shielded welding with a tungsten electrode is used. The weld is terminated by reducing the welding current to zero rather than by removing the torch to break the arc. We have found that welds terminated by breaking the arc invariably leak. The eyelet assembly 125 is then mounted on the lower end plate with its conducting tube 123 slipped into the opening 73 in the intermediate block 71 of the assembly 61 and soldered to the end plate 103 at the flange 135 of the eyelet 125. The wire 131 is then sealed into the tip 133 of the tube 123 extending from the eyelet assembly 125. The cylinder 151 is slipped over the wire 131 and the tip 133. The wire is of such length that it extends a short distance below the end of the cylinder 151. The wire 131 is then slipped into the small cylindrical block 141 and soldered. The cylinder 151 is usually made of an insulator such as polystyrene and the wire should extend sufficiently below the insulator 151 to permit soldering without damage to the insulator. The cylindrical insulator 153 is then slipped over the pin jack 143 and the shell 161 slipped over the insulators 151 and 153 and screwed onto the projection 108.

As thus assembled, the container 41—101—103 is evacuated through the opening 105 to a pressure of the order of one micron and is outgassed for 24 hours at approximately 100° C. The container is then filled with gas consisting of 99% pure argon by volume and 1% pure nitrogen by volume, and the exhaust opening 105 is pinched off and welded. The exhaust opening 105 is pinched off so that it is below the rim of the cap 101 and thus the pinched off opening is not readily damaged.

While the argon-nitrogen mixture just disclosed is to be preferred others may be suitable. Thus we have also produced discharge devices with other gaseous media such as 95% argon and 5% carbon dioxide, and nitrogen at a pressure of 2 atmospheres. Our investigations reveal that the operation with the argon-nitrogen mixture just described was more stable than with the argon-carbon dioxide mixture. The two atmosphere nitrogen medium yielded operational characteristics approaching those of the argon nitrogen, but the electron flow was at a lower rate, and the spurious gamma ray sensitivity was higher than with the argon-nitrogen mixture.

The cylindrical assemblies 11 and 61 are each preferably composed of 63ST aluminum although they may be composed of conductors of other types. The elongated cylinders have a coating 201 of $U_3O_8$ substantially enriched in $U^{235}$, the inner elongated cylinder 17 being coated on the outside surface only, the outer cylinder 41 on the inside surface only and the other cylinders 37, 69 and 93 on both surfaces. The coating has a thickness of the order of 2.0 mg. per square centimeter and extends for each cylinder (for example 37) from a circle 301 opposite the ends of the adjacent interlaced cylinders (69 and 93) to the tips 305. Along the inner surface of cylinder 41 the coating extends from a circle opposite the ends of cylinders 17 and 37 to a circle opposite the ends of cylinders 69 and 93. In a discharge device actually constructed the total coated area is 1020 square cm.

The cylinders 17, 37, 69, 93 and 41 are coated with the $U_3O_8$ before they are assembled. Before the plating is carried out a thin zinc coating is deposited on the cylinders by dipping the cylinders into a solution of zinc oxide and potassium hydroxide. The concentration of the zinc oxide of this plating solution is 100 grams per liter and that of the sodium hydroxide is 25 grams per liter. The coating is effected by electrodeposition from a uranyl nitrate solution containing as an electrolyte .2 Normal ammonium oxalate. The current density for carrying out the uranium oxide coating process is approximately .06 amperes per square cm. and the time required to coat one surface is from one to three hours. The coating provides a strongly adherent uranyl oxide coating which does not tend to chip off.

The eyelet-seal assembly 125 includes Kovar alloy as the metal 123, 127 and a suitable borosilicate glass 129. In securing the metal seal assembly to the end cap 103 both the shoulder 104 of the end cap at which the seal is made and the flange 135 of the eyelet are tinned. But before tinning is carried out, oxide is removed from the surface of the shoulder 104 by scraping under a puddle of molten tin. The lower tip 133 from the eyelet assembly 125 is sealed vacuum-tight by welding.

The spacing between the surfaces of the elongated cylinders 17 and 69, 69 and 37, 37 and 93 and 93 and 41 is set in accordance with our invention at a magnitude such as to yield the most effective response for the fission signal and the minimum response for the alpha ionization signal. The relationship which determines this spacing is shown in Fig. 7 which is a plot of the relationship between the ionization for fission and for alpha particles and the spacings and in which ionization is plotted vertically and spacing horizontally. It is seen that while the fission signal decreases from a maximum at small spacings to a minimum at relatively large spacings between the cylindrical surfaces, as shown by the heavy curve in Fig. 7, the alpha particle ionization is peaked for a predetermined spacing and is otherwise small, as shown by the medium curve in Fig. 7. The spacing should be selected so that it does not correspond to the region of the curves in which the peak is produced. The preferred spacing is that represented by the vertical broken line in Fig. 7 which corresponds to high fission ionization and to very low alpha particle ionization. In accordance with the preferred practice of our invention the spacing between the cylindrical surfaces in the discharge device is of the order of .150 inch. Naturally, discharge devices with other spacings are within the scope of our invention.

In use a discharge device of the type disclosed in Figs. 1 through 3 is connected in a circuit such as is shown in Fig. 4. A high potential of the order of several hundred volts is impressed between the cylindrical assembly 61 and the cylindrical assembly 11, and the signal produced by the current flow from the ionization under this potential is impressed on an amplifier and discriminator 211. The amplifier which is used in the preferred practice of our invention includes a 205B preamplifier and a 204C amplifier made by Atomic Instruments Co. The output of the amplifier is fed into a conventional scaler or counting rate meter designated as a counter 213 in the drawings. It is preferred that the amplifier gain should be of the order of 500,000, and the amplifier should have an input time constant of the order of .75 microsecond. The discriminator may be an ordinary bias for suppressing alpha signals. The desired discriminating effect may be achieved by adjusting the setting of the pulse height which is transmitted so that the spurious alpha and gamma signals are suppressed.

Fig. 5 shows a pair of curves derived by us with the combination disclosed in Fig. 4 which can serve to set the discriminator and thus the transmitted pulse height. In this graph the number of counts both for alpha particles and for thermal neutrons is plotted vertically and the pulse height setting is plotted horizontally. The full line curve shows the response of the apparatus to neutron ionization and the broken line curve to ionization from alpha particles. The broken line curve was produced by observing the response of the apparatus in the absence of a neutron source, and the full line curve was produced by observing the response of the apparatus to neutrons from a polonium-beryllium source embedded in a paraffin moderator. It is seen that the spurious alpha effect may be suppressed by setting the discriminator to transmit signals of pulse height somewhat less than 200. At this discriminator setting the apparatus has substantial sensitivity. Thus we have found that with the discriminator set for an alpha background counting rate of 5 counts per second, the apparatus has a sensitivity of .7 count per neutron per square cm.

In Fig. 6 a curve for determining the potential to be impressed between the cylindrical surfaces is shown. In this curve the number of counts per second derived by subjecting the apparatus to thermal neutron flux whose strength was determined by indium foil measurement is plotted vertically and voltage horizontally. So that the sensitivity may be measured with reference to an unperturbed neutron flux the indium foil was irradiated with the apparatus removed. The Fig. 6 curve shows that the potential need be no more than of the order of 300 volts to achieve the desired sensitivity.

With the apparatus shown in Fig. 4 we have also studied the spurious effects of gamma radiation from a nuclear reactor on our apparatus. The principal spurious background effect is an increase in the background counting rate due to the pile-up of coincident pulses from the gamma ray ionization. This effect is negligible for gamma ray field strengths less than $3.3 \times 10^4$ roentgens per hour. At lower field strength the pile-up pulse amplitude is lower than the alpha particle background signal. At higher gamma ray field strengths the pile-up pulses begin to manifest themselves and the effect is as if the alpha background curve of Fig. 5 were shifted to the right. Since such a shift requires that the discriminator setting correspond to a higher pulse height, there is a loss in sensitivity by reason of the gamma ray pile-up effect. We have found that for $1.1 \times 10^5$ roentgens per hour, the sensitivity loss of our apparatus is 11% and for $2.5 \times 10^5$ roentgens per hour the loss is 27%. It is our experience that a fair assumption for the average energy for all reactor gamma rays is about 2,000,000 electron volts. Under such circumstances a gamma ray flux equivalent to $1.1 \times 10^5$ roentgens per hour would be produced by $2.9 \times 10^{10}$ gammas per square cm. second. In the presence of such intense gamma radiation our apparatus will detect thermal neutrons at low levels. For example, it will detect a thermal neutron flux of the order of 10 neutrons per square cm. seconds.

To determine the effect of intense neutron radiation on our apparatus, it was exposed to neutron irradiation on the order of $4 \times 10^{15}$ neutrons per cm. square and the sensitivity was determined after such irradiation. No change in sensitivity was found.

To determine the effect of the maximum temperature of 80° C. on our apparatus, we observed its operation while the apparatus was heated continuously for 1600 hours at 80° C. Only a 10% reduction in pulse height was observed. When the apparatus was cooled to room temperature it regained its original sensitivity within one hour. We have subjected our counter to extreme shock and vibration tests and have found it to meet these test successfully.

The characteristics of our apparatus are reproducible. We have produced at least 12 units of this apparatus and measured their characteristics. We have found that the operating characteristics of all 12 units are within 10% of each other.

We have thus in accordance with out invention provided a fission counter which has a high sensitivity, is by reason of its cantilever structure capable of withstanding severe shock and vibration, has a minimum response to gamma radiation and may be operated continuously over a temperature range from 20° to 80° C.

While we have shown and described a certain specific embodiment of our invention, many modifications thereof are possible. Our invention therefore is not to be restricted except insofar as is necessitated by the spirit of the prior art.

We claim as our invention:

1. A radiation counter including a pair of electrodes of substantial area disposed in face-to-face relationship at a predetermined spacing between which electrodes a potential is to be impressed, said predetermined spacing being less than the spacing required for maximum alpha particle ionization, said device being characterized by the fact that each electrode comprises a plurality of cylinders of progressively increasing cross-sectional area, at least the cylinders other than the one of smallest area being hollow, said cylinders being coated with a material capable of fission under neutron bombardment, means for mounting said cylinders so that the cylinders of one electrode are interlaced with the cylinders of the other electrode, and means for enclosing said cylinders in a gaseous medium.

2. A radiation counter according to claim 1 characterized by the fact that the cylinder of smallest area is tapered.

3. A radiation counter according to claim 1 characterized by the fact that the cylinders are of elongated form and each of the cylinders is suspended as a cantilever beam.

4. A radiation counter comprising a first plurality of end blocks of progressively increasing cross-sectional area, said end blocks of smaller area being secured within said end blocks of larger area and a cylinder extending from each end block, at least the cylinders extending from the end blocks other than the one of smallest area being hollow; a second plurality of end blocks of progressively increasing cross-sectional area, said last-named end blocks of smaller area being secured within said last-named end blocks of larger area and a hollow cylinder extending from each said last-named end block, the cylinder of each of said last-named end blocks having a larger area than the cylinder of a corresponding end block of said first-named plurality; means for mounting said end blocks in face-to-face relationship so that said cylinders are interlaced and are spaced from each other less than the distance required for maximum alpha particle ionization, said cylinders being coated with a material capable of fission under neutron bombardment and enclosed in a gaseous medium.

5. A radiation counter according to claim 4 characterized by the fact that said cylinders are of elongated form and the cylinder of smallest cross-sectional area is tapered.

6. A radiation counter according to claim 4 characterized by the fact that the cylinders are coated with $U_3O_8$ having a substantial enrichment of the isotope $U^{235}$, the cylinder of smallest cross-sectional area being coated on its outside surface, the cylinder of greatest cross-sectional area on its inside surface and the other cylinders on both surfaces.

7. A radiation counter according to claim 6 characterized by the fact that the coating of $U_3O_8$ has a thickness of the order of 2 milligrams per square centimeter and $U_3O_8$ is enriched in $U^{235}$ to the order of 90%.

8. A radiation counter according to claim 6 characterized by the fact that the gaseous medium is at a pressure of the order of one atmosphere, said medium comprising 99% by volume substantially pure argon and 1% by volume substantially pure nitrogen.

9. A radiation counter according to claim 7 characterized by the fact that the gaseous medium is at a pressure of the order of one atmosphere, said medium comprising 99% by volume substantially pure argon and 1% by volume substantially pure nitrogen.

10. A radiation counter according to claim 9 characterized by the fact that the surfaces of the cylinders are spaced a distance of the order of .150 inch.

11. A radiation counter comprising a first plurality of end blocks of electrical conducting material and of progressively increasing cross-sectional area, said end blocks of smaller area being secured within said end blocks of larger area and forming an electrical conducting contact with said end blocks of larger area, a relatively thin cylinder extending from each said end block, said cylinders other than the smallest one being hollow, a second plurality of end blocks of electrical conducting material and of progressively increasing cross-sectional area, said second end blocks of smaller area being secured within said second end blocks of larger area and forming an electrical conducting contact with said second end blocks of larger area, a hollow cylinder extending from each of said second end blocks and having a larger area than the cylinder of a corresponding end block of said first-named plurality of end blocks; means for mounting said end blocks in face-to-face relationship so that said cylinders are interlaced and said first plurality of end blocks and said second plurality of end blocks are insulated from each other, said interlaced cylinders being uniformly spaced from each other and in addition being coated with a material capable of fission under neutron bombardment, said cylinders being enclosed in a gaseous medium and means for impressing a potential between said first-named and said second-named plurality of end blocks.

12. A radiation counter comprising a first plurality of end blocks of electrical conducting material and of increasing cross-sectional area, said end blocks other than the smallest being hollow, said end blocks of smaller cross-sectional area being shrunk within said end blocks of larger cross-sectional area to form a rigid mechanical structure and an electrical conducting contact between said first plurality of end blocks, a relatively thin cylinder extending from each said end block, said cylinders other than the smallest being hollow, a second plurality of end blocks of electrical conducting material and of increasing cross-sectional area, said second end blocks of smaller cross-sectional area being shrunk within said second end blocks of larger cross-sectional area to form a rigid mechanical structure and an electrical conducting contact between said second plurality of end blocks, a relatively thin hollow cylinder extending from each of said second plurality of end blocks, said first and second plurality of end blocks being mounted at opposite ends of a tubular outer casing so that said extending cylinders are interlaced and uniformly spaced from each other.

13. A radiation counter comprising a first plurality of end blocks of electrical conducting material and of increasing cross-sectional area, said end blocks other than the smallest being hollow, said end blocks of smaller cross-sectional area being shrunk within said end blocks of larger cross-sectional area to form a rigid mechanical structure and an electrical conducting contact between said first plurality of end blocks, a relatively thin cylinder extending from each said end block, said cylinders other than the smallest being hollow, a second plurality of end blocks of electrical conducting material and of increasing cross-sectional area, said second end blocks of smaller cross-sectional area being shrunk within said second end blocks of larger cross-sectional area to form a rigid mechanical structure and an electrical conducting contact between said second plurality of end blocks, a relatively thin hollow cylinder extending from each of said second plurality of end blocks, said first plurality of end blocks being mounted in one end of a tubular outer casing by means of a shrink fit to form an electrical conducting contact with said outer casing and said second plurality of end blocks being mounted on a block of insulating material, said block of insulating material being mounted at the other end of said outer casing so that the cylinders extending from said first and second plurality of end blocks are interlaced and uniformly spaced from each other.

References Cited in the file of this patent

UNITED STATES PATENTS

| | | |
|---|---|---|
| 2,354,786 | Wall | Aug. 1, 1944 |
| 2,440,167 | Broxon et al. | Apr. 20, 1948 |
| 2,449,113 | Fruth | Sept. 14, 1948 |
| 2,494,641 | Anderson et al. | Jan. 17, 1950 |
| 2,598,215 | Borkowski | May 27, 1952 |